United States Patent [19]

Rokowski et al.

[11] Patent Number: 5,534,310
[45] Date of Patent: Jul. 9, 1996

[54] METHOD OF IMPROVING ADHESIVE OF DURABLE COATINGS ON WEATHERED SUBSTRATES

[75] Inventors: Joseph M. Rokowski, Riegelsville; William C. Finch, Blue Bell, both of Pa.

[73] Assignee: Rohm and Haas Company, Philadelphia, Pa.

[21] Appl. No.: 471,945

[22] Filed: Jun. 6, 1995

Related U.S. Application Data

[62] Division of Ser. No. 292,130, Aug. 17, 1994.

[51] Int. Cl.$^6$ .......................................................... B05D 3/06
[52] U.S. Cl. .......................... 427/494; 427/508; 427/518; 427/520
[58] Field of Search .................................. 427/520, 494, 427/508, 518

[56] References Cited

U.S. PATENT DOCUMENTS

| | | | |
|---|---|---|---|
| 3,607,834 | 9/1971 | Mars et al. | 260/63 |
| 4,296,226 | 10/1981 | Braun et al. | 526/316 |
| 4,421,889 | 12/1983 | Braun et al. | 524/381 |
| 4,777,265 | 10/1988 | Merger et al. | 548/320 |
| 4,791,151 | 12/1988 | Kowalski et al. | 523/201 |
| 4,812,541 | 3/1989 | Mallya et al. | 526/264 |
| 4,855,349 | 8/1989 | Ingle | 524/432 |
| 4,906,684 | 3/1990 | Say | 524/548 |
| 4,908,229 | 3/1990 | Kissel | 427/54 |
| 4,908,403 | 3/1990 | Spada et al. | 524/818 |
| 4,929,661 | 5/1990 | Noomen et al. | 524/259 |
| 5,055,506 | 10/1991 | Knutson | 524/100 |
| 5,270,380 | 12/1993 | Adamson et al. | 524/556 |
| 5,296,530 | 3/1994 | Bors et al. | 524/558 |
| 5,349,026 | 9/1994 | Emmons et al. | |
| 5,362,816 | 11/1994 | Snyder et al. | |
| 5,426,156 | 6/1995 | Bederke et al. | |

FOREIGN PATENT DOCUMENTS

| | | |
|---|---|---|
| 2057768 | 6/1992 | Canada . |
| 358358 | 3/1990 | European Pat. Off. . |
| 483915 | 5/1992 | European Pat. Off. . |
| 555774A1 | 2/1993 | European Pat. Off. . |
| 552469 | 7/1993 | European Pat. Off. . |
| 2535372 | 2/1977 | Germany . |
| 3713511 | 12/1987 | Germany . |
| 62-172027 | 7/1987 | Japan . |
| 1185216 | 3/1970 | United Kingdom . |
| 1541891 | 3/1979 | United Kingdom . |
| 9316133 | 8/1993 | WIPO . |
| 9503350 | 2/1995 | WIPO . |

Primary Examiner—Michael Lusignan
Assistant Examiner—Erma Cameron
Attorney, Agent, or Firm—Sudhir G. Deshmukh

[57] ABSTRACT

A latex binder suitable for producing high gloss coating on weathered substrates and a method for producing such coatings. The binder includes a low molecular weight and low acid number latex polymer having an acid functional and an enamine functional moiety that results from the reaction of ammonia or amine with an acetoacetyl functional pendant moiety on the latex polymer. A film containing the latex binder is applied on a substrate and then exposed to ambient light and air to produce a high gloss highly adherent film on difficult to adhere surfaces, such as weathered chalky substrates.

8 Claims, No Drawings

METHOD OF IMPROVING ADHESIVE OF DURABLE COATINGS ON WEATHERED SUBSTRATES

This is a divisional of application Ser. No. 08/292,130, filed Aug. 17, 1994.

This invention generally relates to an improved method of producing durable coatings and more particularly relates to coatings having improved adhesion to weathered substrates.

An ideal surface coating would have a high degree of adhesion to a variety of substrate surfaces under a variety of atmospheric and end use conditions, dirt-pick up resistance, desired degree of gloss, scratch resistance, solvent resistance, crack resistance on wood substrates, long shelf or pot life, low film formation temperature, ease of applicability, minimally damaging to the environment, etc. Aqueous dispersions of polymer particles, also referred to in the art as latex polymers, meet many of these requirements, especially as the amount of volatile organic component (VOC) permitted in the air, under stricter environmental laws, continues to be reduced. Aqueous dispersions also known as water borne dispersions of polymers are, thus, becoming increasingly more important than solvent-based polymer dispersions. Aqueous dispersions typically include 25 to 70 percent water as a dispersing vehicle.

It is advantageous for coatings to cure quickly, particularly to develop favorable surface properties such as, for example, print and block resistance and resistance to weathering. In the particular case of coatings incorporating emulsion-polymerized latex binders, there is a need for a softer latex polymer, i.e., a polymer with a low glass transition temperature (Tg), so that facile film formation can be achieved. However, there exists a simultaneous need for the surface hardness, print resistance, outdoor durability, etc., which are characteristics typically seen in harder polymers. This problem can be solved by using a latex binder which will cure quickly after a film is formed, thereby achieving a beneficial level of coating properties exhibited by harder polymers. One approach had been to cure the film by exposing it to actinic radiation, such as, sunlight.

Its been known to expose coatings to ultraviolet radiation ("UV") or sunlight by providing coatings with an enamine content sufficient to enhance the cure rate of the coating. Its been also known to use a photosensitive resin composition composed of a base polymer which consists of acrylic resin containing acetoacetyl group, an ethylenic unsaturated compound and a photopolymerization initiator.

However, there exists a need for high-gloss, adherent coatings applied on weathered substrates, such as chalky substrates, which retain their gloss even under extended outdoor conditions.

Furthermore, there exists a need for high-gloss crack resistant coatings applied over wooden substrates, which tend to develop cracks when exposed to outdoor conditions. The use of low molecular weight polymers to achieve increased adhesion to chalky repainted substrates has, without the acetoacetyl modification, been generally accompanied by reduced adhesion to dimensionally unstable wood substrates such as white pine, Southern Pine and Australian Mountain ash, etc.

The present invention is directed to a latex binder suitable for producing a high gloss adherent coating on a weathered substrate comprising, an aqueous evaporable carrier having dispersed therein a latex polymer bearing an acid functional pendant moiety and enamine functional pendant moiety resulting from the reaction of acetoacetyl functional pendant moiety on the latex polymer with ammonia or amine, the polymer having a peak molecular weight in the range of 10,000 to 200,000, and an acid number in the range of 1 to 70.

The present invention is further directed to a method for producing a high gloss adherent coating on a weathered substrate comprising, applying on the substrate a film of a latex binder comprising an aqueous evaporable carrier maintained at a pH of 8.5 to 9.5 and having dispersed therein a latex polymer bearing an acid functional pendant moiety and enamine functional pendant moieties resulting from the reaction of acetoacetyl functional pendant moieties on the latex polymer with ammonia or amine, the polymer having a peak molecular weight in the range of 10,000 to 200,000, and an acid number in the range of 1 to 70, evaporating the aqueous evaporable carrier from the film, and exposing the film to actinic light and air to cure the film into the high gloss adherent coating on the weathered substrate.

In the ensuing description, certain terms and terminology generally known by those of ordinary skill in the art will be utilized for purposes of conciseness, and for otherwise describing the features and advantages of the present invention. Such terms are either defined as follows or are otherwise intended to mean the following:

Latex polymers, as defined herein, are polymer particles dispersed in an aqueous medium. The latex polymer can also be a sequential emulsion polymer, such as for example, a core/shell polymer with the reactable group located on the shell or the relatively more hydrophilic portion of the polymer. Generally, the dispersion and stability of the latex polymer is an anionically stabilized emulsion polymer with a negative surface potential of −10 millivolts and higher (higher as used herein means more negatively charged, such as for example, 20 millivolts), as determined by zeta potential measurements.

Emulsion polymer is a latex polymer produced by the emulsion polymerization process.

Latex binder is a film forming substance or a combination of substances which includes a latex polymer, coalescing agents, surfactants and an evaporable carrier or vehicle, such as water. The binder may optionally include a pigment.

Peak molecular weight (Mp) of a latex polymer, as defined herein, is the peak value obtained from a molecular weight distribution plot, which has weight fraction on ordinate (Y-axis) and specific molecular weight on abscissa (X-axis). Weight fraction is defined as a ratio of polymer of a specific molecular weight in a latex polymer sample to the total weight of the sample. The molecular weight distribution plot is obtained by gel permeation chromatography (GPC) as described on page 4, Chapter I of The Characterization of Polymers published by Rohm and Haas Company, Philadelphia, Pa. in 1976, utilizing polymethyl methacrylate as the standard. As a measure of polymer molecular weight, the peak molecular weight is preferred over the more commonly used weight average molecular weight (Mw) because the peak molecular weight measurement is not sensitive to the presence of higher molecular weight polymer fractions. The present invention may include low levels of less than 30%, preferably less than 20%, most preferably less than 10%, by weight of higher molecular weight polymers, which have a peak molecular weight above 500,000. Unlike Mp, the presence of higher molecular weight polymer fractions skews Mw since Mw is averaged over the entire molecular range and thus tends to artificially inflates the measured molecular weight.

An acid number, as defined herein, is the number of milligrams of potassium hydroxide that would be required to completely neutralize the acid content in one gram of solid polymer and it is calculated by dividing the number of millimoles of monomeric acid used in the preparation of the latex polymer by the total weight of the polymer, which is the weight of all monomers plus the weight of any chain transfer agent used in the polymer preparation, and then multiplying by the result by 56.

Unless otherwise indicated, references to "percent" shall be understood to mean "weight percent" based upon total weight.

A weathered substrate, as defined herein, is a substrate that has been exposed to cyclical weathering actions resulting from any combination of sunlight or varied atmospheric conditions, such as dry, moist, rainy, hot, cold, icy conditions or a combination of such conditions. Such weathering actions are especially severe on surfaces previously coated with alkyd paints since these atmospheric conditions produce a friable or chalky powder on the surface of an alkyd based coating. The chalky or friable surface results from the disintegration of the binding medium, such as an alkyd binder, by the cyclical weathering action, which is particularly severe in the tropical or Pacific rim countries. The chalky or friable surface typically includes loose calcium carbonate particles disposed on the surface of the substrate.

A weathered substrate, as defined herein, further includes a wood substrate exposed to outdoor conditions, which tend to produce cracks in wood substrate. The weathering of unpainted wood substrates also causes a chemical and physical change in the structure of the wood as it is exposed to the elements and ultraviolet radiation. New wood is typically smooth while weathered wood is rough, more porous, and surface oxidized than new wood. The negative effect of wood weathering on the adhesion of coatings has been well documented by The US Department of Agriculture Forest Products Service Laboratory in by W. Feist in The Forest Products Journal, 38,(3) pp.22–28 and by the same author in Advances in Chemistry series 225, Washington D.C., American Chemical Society, Chapter 11.

In one aspect we have found that when latex polymers bearing acetoacetyl functional pendant moieties are treated with an excess of a stoichiometric amount of ammonia or primary amine, formation of enamine functional pendant moieties occurs. These enamine functional pendant moieties are more reactive, when exposed to actinic light, than the same acetoacetyl functional moieties not treated with ammonia or primary amine. The polymers which contain the enamine form of the acetoacetyl functional group show a more rapid development of properties indicative of cure, such as a quickly reduced swell ratio and a quick reduction in soluble fraction. This demonstrates that the actinically-induced cure of the enamine functional polymer progresses more rapidly than actinically-induced cure of the corresponding acetoacetyl functional polymer. In general, any polymerizable hydroxy functional monomer can be converted to the corresponding acetoacetate by reaction with diketene or other suitable acetoacetylating agent. In any application, the amount of acetoacetyl functional monomer required will vary from case to case depending upon the desired degree of cure necessary in the particular end use application. It has been unexpectedly discovered that acetoacetyl functional group bearing latex polymers having lower molecular weights than conventional acetoacetyl functional group bearing latex polymers exhibit enhanced adhesion to chalky substrates. Furthermore, these latex polymers also exhibit improved coverage of wood substrate that tend to develop cracks when exposed to atmospheric conditions described earlier.

The latex polymer suitable for use in the present invention is produced from one or more monomers that introduce acetoacetyl functional pendant moieties having the ability to form stable enamine structures by reaction with amines. The latex polymer contains from 2% to 20%, preferably 4% to 15%, and most preferably 6% to 10% of one or more acetoacetyl functional monomers, by weight based on the weight of the latex polymer. These monomers have the following structures:

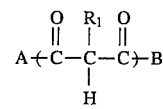

wherein $R_1$ is either H, alkyl having 1 to 10 carbon atoms or phenyl; wherein A is either:

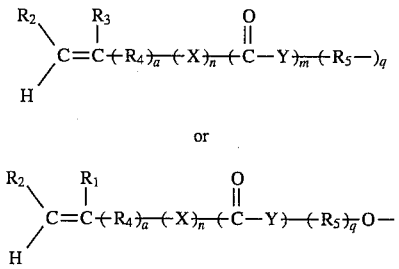

wherein $R_2$ is either H, alkyl having 1 to 10 carbon atoms or phenyl, substituted phenyl, halo, $CO_2CH_3$, or CN; wherein $R_3$ is either H, alkyl having 1 to 10 carbon atoms or phenyl, substituted phenyl, or halo; wherein $R_4$ is either alkylene having 1 to 10 carbon atoms or phenylene, or substituted phenylene; wherein $R_5$ is either alkylene or substituted alkylene; wherein a, m, n, and q is either 0 or 1; wherein each of X and Y is either —NH— or —O—; and wherein B is either A, alkyl having 1 to 10 carbon atoms or phenyl, substituted phenyl, or heterocyclic. Preferably ethylenically-unsaturated acetoacetyl monomers include, among the following, various acetoacetamides, including but not limited to:

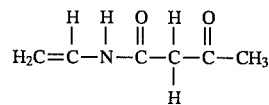

and

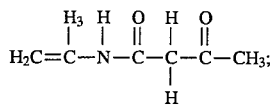

acetoacetoxyethyl methacrylate ("AAEM"); acetoacetoxyethyl acrylate ("AAEA"); allyl acetoacetate; vinyl acetoacetate; or combinations thereof.

AAEM is structurally represented as:

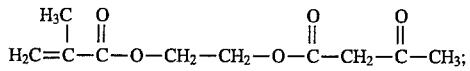

AAEA is structurally represented as:

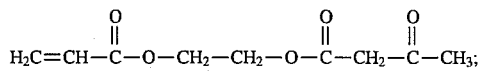

allyl acetoacetate is structurally represented as:

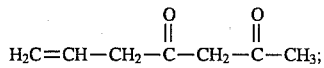

and vinyl acetoacetate is structurally represented as:

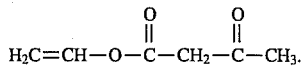

Particularly preferred ethylenically-unsaturated acetoacetyl monomer includes acetoacetoxyethyl methacrylate, acetoacetoxyethyl acrylate, acetoacetoxypropyl methacrylate, allyl acetoacetate, acetoacetoxybutyl methacrylate, 2,3-di(acetoacetoxy)propyl methacrylate, or combinations thereof.

The latex polymer further comprises acid functional pendant moiety sufficient to provide the latex polymer with an acid number in the range of 1 to 70, preferably 3 to 40, and most preferably 5 to 25. The desired acid number is achieved by controlling the amount of acid functional monomer utilized in producing the latex polymer. The desired range of the acid number stated above is obtained by utilizing the latex polymer containing from 0.2% to 10%, preferably 0.5% to 6% and most preferably 1% to 4% by weight of the latex polymer of acid functional monomer comprising phosphoethyl methacrylate monomer or ethylenically-unsaturated carboxylic acid monomers, such as acrylic acid, fumaric acid-monoethyl ester, fumaric acid, itaconic acid, maleic acid, maleic anhydride, methacrylic acid, fumaric acid-monomethyl ester, methyl hydrogen maleate, or combinations thereof.

Preferred ethylenically-unsaturated carboxylic acid monomer is selected from the group consisting of acrylic acid, methacrylic acid, and combinations thereof. If the acid number of the latex polymer suitable for the present invention exceeds 70, a film made from such a latex polymer becomes water sensitive. Water sensitivity typically results in film swelling, which thereby weakens the adhesion of the film to weathered substrates.

The latex polymer suitable for the present invention is provided with a peak molecular weight in the range of 10,000 to 200,000, preferably 25,000 to 120,000, and most preferably 40,000 to 90,000. If the molecular weight of the latex polymer exceeds 200,000, the adhesion of the resultant coating to chalky substrate would be weakened. Furthermore, if the molecular weight of the latex polymer drops below 25,000, the water sensitivity increases, which thereby weakens the adhesion of the resultant coating to weathered substrates and in addition the gloss retention of the resultant coating on weathered substrates would decrease.

The average particle size on the diameter of the latex polymer suitable for use in the present invention may vary from 30 to 800 nanometers, preferably from 50 to 500 nanometers and most preferable from 80 to 200 nanometers. The particle size used herein is expressed as the weight average diameter in nanometers, as determined through electron microscopy.

In another embodiment of this invention, the latex binder contains copolymer particles made up of at least two mutually incompatible copolymers. These mutually incompatible copolymers may be present in the following morphological configurations, for example, core/shell, core/shell particles with shell phases incompletely encapsulating the core, core/shell particles with a multiplicity of cores, interpenetrating network particles, and multilobal particles descibed in the commonly assigned U.S. Pat. No. 4,791,151. In all of these cases, the majority of the surface area of the particle will be occupied by at least one outer phase and the interior of the particle will be occupied by at least one inner phase. The mutual incompatibility of the two polymer compositions may be determined in various ways known in the art. The use of scanning electron microscopy using staining techniques to emphasize the difference between the appearance of the phases, for example, is such a technique.

The emulsion polymerization techniques used to prepare such dispersions are well known in the art. It is sometimes advantageous to introduce some crosslinking or gel structure by the sequential polymerization process in the core via low levels of a crosslinking monomer such as allyl methacrylate. The lightly crosslinked core does not adversely affect film formation and does in some cases result in better coatings, particularly when the pendant acetoacetate is concentrated in the shell.

In another embodiment of the present invention, the latex polymer suitable for use in the latex binder may comprise a blend of a first polymer having an acid functional pendant moiety and a second polymer having an acetoacetyl functional pendant moiety. If desired, a third polymer having both acid and acetoacetyl functional pendant moieties may be also included in the blend.

The various proportions of the first, second and the optional third polymer in the latex polymer described above are adjusted in the same weight percentage proportions as those described earlier with respect to these pendant moieties to acheive comparable peak molecular weight and acid number.

Optionally, 0% to 2% of an ureido functional monomer such as those ureido acrylates and ureido methacrylates disclosed in U.S. Pat. No. 4,777,265 may be included in the latex polymer for further improvements in adhesion to substrates.

The latex polymer may optionally further include at least one monomeric or polymeric acrylic or methacrylic acid ester as well as at least one polymeric or monomeric alkene such as ethylene or at least one vinylic monomer or polymer, provided that any such additional optional ingredient is addition-polymerizable with the acetoacetoxy functional moiety-containing and acid moiety-containing ingredients briefly mentioned above.

Examples of suitable acrylic and methacrylic acid esters include but are not limited to methyl acrylate ("MA"), methyl methacrylate ("MMA"), ethyl acrylate, ethyl methacrylate, propyl acrylate, propyl methacrylate, butyl acrylate ("BA"), butyl methacrylate, 2-ethyl hexyl acrylate ("2-EFTA"), 2-ethyl hexyl methacrylate, decyl acrylate, decyl methacrylate, hydroxyethyl acrylate, hydroxyethyl methacrylate ("HEMA"), hydroxypropyl acrylate, hydroxypropyl methacrylate, or combinations thereof.

Suitable vinyl monomers include but are not limited to acrylamide; acrylonitrile; 1,2-butadiene; 1,3-butadiene; chloroprene; 1,3,5-hexatriene; styrene ("St"); alpha-methyl styrene; vinyl acetate; vinyl chloride; vinyl toluene; vinyl versatate, vinylidene chloride; or combinations thereof.

The latex binder additionally includes an aqueous evaporable carrier, which typically includes water or water and additional volatile ingradient, such as ammonia or amine.

The latex binder may comprise additional ingredients, such as, polymer thickeners, surfactants, polymeric flowmodifying ingredients, and various dispersion or emulsion polymers as well as various solution polymers.

The latex polymer of the present invention includes ammonia or amines to form enamine from the acetoacetyl functional group. Some of the most suitable amines include ethanolamine, methyl amine, isopropyl amine, ethanol amine, diglycol amine or combinations thereof. The amount of ammonia or amine used to form enamine should be at least equivalent to the amount of acetoacetate and copolymerized acid in the latex polymer. Sterically hindered primary amines such as t-butyl amine and aromatic amines such as aniline are not suitable because of incomplete enamine formation. The enamine formation is a reversible reaction, so that as the ammonia or amine evaporates, the pendant acetoacetate is regenerated in the film, but not before cure of the enamine composition has occurred. The wet composition is quite storage stable, however, as long as it is stored under conditions (such as a closed container) where the amine/ammonia cannot evaporate.

A typical method of preparing coatings from the latex polymer of the present invention is to treat an acetoacetyl functional polymer with ammonia or primary amines, then allow the composition to equilibrate. As the ammonia or amine reactant is consumed in the enamine formation reaction, the pH of the composition will drop. We have found that readjusting the pH with ammonia or primary amines to 8.5 improves the rate of cures. Preferably, the pH is adjusted to 9, more preferably 9.5.

The latex polymers suitable for use in the present invention may be prepared by well known polymerization techniques, such as, suspension polymerization and emulsion polymerization of ethylenically unsaturated monomers. Emulsion polymerization is preferred.

Those above-discussed monomers and polymeric ingredients which are used to make the latex polymer having either acid-functional pendant moieties, or acetoacetoxy functional pendant moieties, or both, are typically polymerized in the presence of a small amount of a conventional free-radical initiator. Suitable initiators, also called catalysts, include but are not limited to certain water-soluble initiators, various azo compounds, and select redox combinations.

Suitable water-soluble initiators include but are not limited to peracetic acid; certain persulfates, such as sodium, potassium, ammonium, and barium persulfate; acetyl peroxide; hydrogen peroxide; hydroperoxides such) as tertiary-butyl hydroperoxide; or combinations thereof. A presently preferred water-soluble free-radical initiator is ammonium persulfate.

Suitable azo initiators include but are not limited to azodiisobutyl nitrile; azobisdimethyl valeronitrile; azodiisobutyl amide; azobis(alphaethylbutyl nitrile); azobis(alpha, gamma-dimethyl-capronitrile); or combinations thereof.

One redox combination, suitable for purposes of the present invention, may include a water-soluble persulfate as the oxidizing component of the redox combination, and a hydrosulfite, e.g. sodium hydrosulfite, as the reducing component of the redox combination. Further in accordance with principles of the present invention, water-soluble bisulfites, metabisulfites, thiosulfates, or formaldehyde sulfoxylates, may be used in lieu of the hydrosulfites.

As was briefly mentioned above, one step of a preferred method of producing the latex polymer of the present invention is to combine preselected amounts of initiator, surfactant, evaporable aqueous carrier and emulsion-polymerizable ingredients in an agitated reactor of suitable size, and to heat the agitated reactor contents to a desired reaction temperature over a predetermined period of time, thereby producing an aqueous polymeric emulsion. A chain-transfer agent may be used at this time or, if desired, at a later stage described below for regulating the peak molecular weight of the latex polymer.

During the reaction-hold period, after the emulsion-polymerizable ingredients have substantially addition-polymerized, it may be desirable to incorporate certain additional amounts of initiator or initiators, into the agitated reactor contents, to achieve a desired degree or percentage of conversion or completion of the reaction of polymerizable ingredients. Such additional amounts of initiator or ingredients may be the same as or may be different from the initiator ingredient or ingredients selected initially.

For purposes of regulating the molecular weight of the latex polymer being formed, suitable chain-transfer agents include well known halo-organic compounds, such as, carbon tetrabromide and dibromodichloromothane; sulfur-containing compounds such as the alkylthiols including ethanethiol, butanethiol, tert-butyl and ethyl mercaptoacetate, as well as the aromatic thiols; or various other organic compounds having hydrogen atoms which are readily abstracted by free radicals during polymerization.

Upon achieving desired reaction conversion, the reactor contents may be maintained at the initial reaction temperature or may be cooled to a temperature less than the reaction temperature, as desired.

Additional suitable chain-transfer agents or ingredients include but are not limited to butyl mercapto propionate; iso octyl mercapto propionic acid; iso octyl mercapto propionate ("IOMP"); bromoform; bromotrichloromethane ("BTCM"); carbon tetrachloride; alkyl mercaptans such as 1-dodecanethiol, tertiary-dodecyl mercaptan, octyl mercaptan, tetradecyl mercaptan, and hexadecyl mercaptan; alkyl thioglycolates such as butyl thioglycolate, iso octyl thioglycolate, and dodecyl thioglycolate; thioesters; or combinations thereof. 1-dodecanethiol is preferred.

The amount of chain-transfer agent needed to achieve a particular molecular weight, moreover, can be estimated by the use of the Mayo equation. (See, e.g., pages 226–233 of a text entitled *Principles of Polymerization*, second edition, by George Odian, published 1981 by John Wiley & Sons, Inc.). The latex polymer having the peak molecular weight in the desired range described earlier is achieved by utilizing 0.1% to 2%, preferably 0.25% to 1.5%, and most preferably 0.4% to 1.0% of the chain transfer agent, based on the total latex polymer weight.

Upon achieving desired reaction conversion, the pH of the reactor contents will be less than 7, and typically will be in the range of 2.5 to 6. At such pH conditions, the thus-produced addition-polymer particles, which are typically insoluble in the acidic aqueous phase, may give rise to a latex having a milky-white appearance. Regardless of the latex appearance, an effective amount of base is then added to the reactor contents for preventing gellation.

In any event, the composition of matter thus also includes an amount of base which is effective for producing and maintaining a latex polymer of the present invention having enamine functional pendant moiety.

If the acid value of the emulsion polymer is low (below 70 mg KOH/g of polymer), the polymer will typically not completely dissolve when the basic component is added; and the white, milky appearance may thus persist. The polymer particles may become swollen or may be relatively unaffected by the base, depending upon the specific monomers used and the acid value of the polymer.

In lieu of the above-discussed illustrative preferred emulsion-polymerization method, the emulsion polymerization reaction can also be conducted, for example, by performing the step of introducing a major portion of the total amount of initiator, surfactant, chain-transfer agent, and evaporable aqueous carrier into the reaction vessel, in the manner described above, and separately performing the step of pre-emulsifying the emulsion-polymerizable mixture in a minor portion of the total amount of initiator, surfactant, chain-transfer agent, and evaporable aqueous carrier, for purposes of producing a pre-emulsion mixture; and, thereafter, performing the step of introducing the pre-emulsion mixture into the reaction vessel which already containing the major portion amounts of initiator, surfactant, optional chain-transfer agent, and evaporable aqueous carrier. The chain transfer agent may be introduced at any one of the stages described above.

The evaporation of the volatile components or ingredients of the latex polymer, including amine or ammonia and water converts the enamine functional pendant moiety of the latex polymer back into the acetoacetyl functional pendant moieties within the composition, which cures when exposed to oxygen in air and actinic radiation, such as sunlight.

The coatings prepared from the latex binder of the present invention may be used to prepare exterior as well as interior coatings which develop cure under exposure to air and actinic light, such as sunlight, fluorescent or UV light.

Actinic light, such as sunlight will promote a rapid development of cure in these coatings, shortening the period in which the newly applied coating is vulnerable to forces which could damage or remove the coating or mar the appearance.

Photoinitiators, such as benzophenone, may be added to further enhance the speed of cure. The coatings prepared from the latex binder of the present invention may be cured by using a source of ultraviolet radiation of wavelengths between 200 nm. and 400 nm. The coatings are preferably cured by exposure to light and air. The coatings are substantially cured after exposure to sunlight and air for 1 to 10 days, depending upon the air temperature, the hours of sunlight exposure and relative humidity.

Coating from the latex binder of the present invention provides improved solvent resistance and enhanced outdoor durability as may be evidenced, for example, by higher retention of the original gloss of exterior coatings after outdoor exposure or simulated outdoor exposure. The present invention is suitable for coatings on weathered substrates, including architectural coatings, such as, exterior house paints, mastics and caulks, and industrial maintenance coatings for metal, such as exposed structural steel on bridges, above-ground storage tanks, etc., which are exposed to incident sunlight and outdoor conditions. Also included are coatings which are exposed to incident sunlight even though they are partially or wholly inside a structure such as, for example, a building, marble and terrazzo, concrete, stone floors and an automobile.

Still another application for the latex binder of the present invention is in the production of water-based adhesives for various consumer and industrial uses.

Industrial end-use applications include surface coatings and finishes for construction machinery and equipment, for bridges and road surfaces, for various parts or components of certain production-line machinery, and for a wide assortment of automotive components.

End-use applications for wood for industrial use, home use, and otherwise, include but are not limited to interior and exterior wood surface coatings such as stains, primers and varnishes. The latex binder of the present invention is especially suitable for bridging the cracks typically generated on weathered wood surfaces.

The novel aqueous latex binder of the present invention can also be used in certain finishes as well as other surface treatments for a number of relatively thin substrates such as paper, wherein such finishes and surface treatments are able to cure without liberating formaldehyde. Such an end use is particularly desirable, for example, in the production of release coatings, overprint varnishes, and especially in relation to the production of rotogravure coatings.

Yet another specific end use for the polymer binder of the present invention is in the production of a wide assortment of architectural surface coatings which need to form films of various thicknesses, at relatively low temperatures, from 25° C. to 0° C. and yet which provide desirable surface hardness and durability qualities, due to their cured polymeric structure.

EXAMPLES

TEST PROCEDURES

The following test procedures were used to generate the data reported in the Examples below:

Preparation of Weathered Substrates

Chalky (latex based) substrate preparation: An exterior latex paint was made with 11.3 kilograms of anatase grade titanium dioxde per 386 liters of paint was applied to cedar panels. The panels were dried for one week and then exposed outdoors facing south at an angle of 45 degrees until they developed a chalk rating of ASTM 5 or 6, as defined by American Society of Testing Materials, Philadelphia, Pa.

Chalky (alkyd based) substrate preparation: The paint used for this substrate preparation was a Sherwin Williams Promar® alkyd paint. The same panel preparation as described above was followed to develop a chalk rating of ASTM 5 or 6.

Weathered aluminum substrate: Several previously painted aluminum siding panels from the northwest exterior side of a house were used. These panels had art outdoor exposure of about nine years.

Force to Peel Adhesion on Weathered-Chalky Latex, Weathered-Chalky Alkyd and Weathered-Previously Painted Aluminum Siding Using a one-inch brush, 2.5 grams of test paint was applied to a 4.8 cms×15.4 cms area of the weathered substrate. A 3.6 cms×23.5 cms strip of cheesecloth was placed lengthwise on the wet paint leaving 3.6 cms overhanging on each end. The cheeseloth was firmly pressed into the wet paint and an additional 7.5 grams of paint was applied to the cheesecloth and dried for one week at 25° C./50% Relative Humidity. Using a utility knife and a 2.5 cms wide×23.5 cms long template, a 2.5 cms×23.5 cms strip was cut through the length of the cheesecloth. The test panel was placed in a fog box (ie. a water mist cabinet) for one hour. The test time can be increased to increase the severity of the test. The test panel was removed from the fog box and clamped at both ends horizontally to a ring stand, slanting the panel approximately ten degrees back from the perpendicular using utility/burette clamps. The thin edge of the panel must be in the upright position. A weight hanger was attached to the end of the cheesecloth using an S-hook or paper clip, increasing the weight on the weight holder, until the cheesecloth peeled away from the substrate at a fixed rate of peel (ie. in mm/5 sec) within the range between 5–10 mm/5 sec. The weight was recorded up to and including 1500 grams to achieve a fixed rate of pull. Weights greater than 1500 up to 2000 grams are reported as >1500 grams for a fixed rate of pull. Higher weight values indicated better adhesion.

Exterior Durability on Weathered Bare Wood Panels

Test panels were prepared from yellow pine panels exposed in a southerly direction at a 45 degree angle for three months. Two coats of test paint from Example 7 descibed below were applied to the test panels using a four hour recoat time. The panels were then allowed to dry for one week at 25° C./50% Relative humidity. The painted panels were then exsposed facing south at a 45 degree angle and examined after 13 months for cracking and loss of adhesion/flaking according to ASTM methods D661 and D772 described n the 988 Annual Book ASTM Standards for Paint:Tests for Formulated Products and Coatings. Cracking and flacking were rated bewteen 0 and 10, higest number being the best. A difference of 0.3 units between ratings was considered a significant difference.

Dirt Pickup Resistance

Formulated Coatings were drawn-down on an aluminum "Q" panel using a 3.0 mil (76.2 microns) Bird Wet Film Applicator®, supplied Pacific Scientific Instruments Division, Silver Springs, Md. The samples were dried for one week at 25 ° C./50% R.H. The coated panels were then placed:

a) in a Weather-O-Meter®, Atlas Electric Devices Company, Chicago, Ill. for a specified time or b) on a QUV cabinet, supplied by Q Panel Company, Clevland, Ohio, for a specified time.

The panels were then removed and Y-reflectance was measured using a Pacific Scientific Colorguard 45/0 Reflectometer® (Gardner/Neotec instrument Division, Silver Springs, Md.). An average of three readings was taken. The panels were then placed in a fog box for 1.5 hours. The panels were removed, blotted dry. A uniform aqueous mixture was produced by dispersing 125 grams of a Mapico® 422 Iron Oxide supplied by Columbian Chemicals Company, Tulsa, Okla. and two drops of Tamol® 731 anionic copolymer dispersing resins available from Rohm and Haas Co., Philadelphia, Pa., in 250 grams of water. The foregoing mixture was dispersed using a Lightnin' mixer supplied by Mixing Equipment Company, Inc., Rochester, N.Y.) and then brush applied on the dry panel surfaces.

The slurry coated panels were air dried for 3 hours. The test panels were then placed in a 65° C. oven for one hour, removed and allowed to cool for 30 minutes. Each panel was washed under tepid water while rubbing lightly and evenly with a new cheesecloth pad. The panels were then air dried for a minimum of four hours and three reflectance readings were taken over the stained area, averaged togeher and reported. Higher readings indicate better dirt pick-up resistance.

EXAMPLE 1

Latex polymer I was prepared as follows:

A monomer emulsion was prepared by mixing the monomers, butyl acrylate (936.0 grams), methyl methacrylate (801.0 grams), ureido methacrylate (18.0 grams), and acrylic acid (45.0 grams), with deionized water (570 grams) and a 25% aqueous solution (adjusted to pH 7 with ammonia) of Waylos M-60 (45.1 grams). Into a 5 liter flask, a portion of this monomer emulsion (181.7 grams) was added to a mixture, which was at 71° C., of deionized water (1300 grams) and a 25% aqueous solution (adjusted to pH 7 with ammonia) of Wayfos® M-60 anionic phosphate surfactant, supplied by Olin Corporation, Stamford, Conn. (113.3 grams). A solution of ammonium carbonate (5.9 grams) in deionized water (90 grams) was added to the reaction flask followed by a solution of ammonium persulfate (5.6 grams) in deionized water (40 grams). The remainder of the monomer emulsion was then gradually added over 145 minutes while the reaction mixture was maintained at 81° C. After the 145 minute period the reaction was held at 81° C. and 0.1% aqueous ferrous sulfate (10.0 grams), tert-butyl hydroperoxide (1.1 grams of 70% active material) in deionized water (6.0 grams), and isoascorbic acid (0.8 grams) in deionized water (10.0 grams) were added. The tert-butyl hydroperoxide/isoascorbic acid treatment was repeated after a 15 minute period. The reaction mixture was then cooled to 60° C. and enough aqueous ammonia (28%) was added to bring the final pH to 9.0. The reaction mixture was cooled to room temperature, filtered through a 100-mesh screen (on which <0.1 grams of damp coaggullum was collected), and characterized. The final polymer emulsion had a solids content of 45.0% and a particle size of 109 nm (measeured by Brookhaven BI-90 Particle Sizer supplied by Brookhaven Instruments Corporation, Holtsville, N.Y.). The latex polymer I had art acid number of 19.

EXAMPLE 2

Latex polymer II was prepared as follows:

A monomer emulsion was prepared by mixing the monomers, butyl acrylate (468.0 grams), methyl methacrylate (400.5 grams), ureido methacrylate (9.0 grams), and acrylic acid (22.5 grams), and the chain transfer agent, 1-dodecanethiol (9.0 grams), with deionized water (285 grams) and a 25% aqueous solution (adjusted to pH 7 with ammonia) of Waylos® M-60 anionic phosphate surfactant (32.3 grams). Into a 3 liter flask, a portion of this monomer emulsion (90 grams) was added to a mixture, which was at 71° C., of deionized water (650 grams) and a 25% aqueous solution (adjusted to pH 7 with ammonia) of Wayfos® M-60 anionic phosphate surfactant (46.5 grams). A solution of ammonium carbonate (2.9 grams) in deionized water (20 grams) was added to the reaction flask followed by a solution of ammonium persulfate (2.8 grams) in deionized water (20 grams). The remainder of the monomer emulsion was then gradually added over 144 minutes while the reaction mixture was maintained at 81° C. After the 144 minute period the reaction was held at 81° C. and 0.1% aqueous ferrous sulfate (5 grams), tert-butyl hydroperoxide (0.55 grams of 70% active material) in deionized water (3.0 grams), and isoascorbic acid (0.4 grams) in deionized water (5.0 grams) were added. The tert-butyl hydroperoxide/isoascorbic acid treatment was repeated after a 15 minute period. The reaction mixture was then cooled to 60° C. and enough aqueous ammonia (28%) was added to bring the final pH to 9.1. The reaction mixture was cooled to room temperature, filtered through a 100-mesh screen (on which <0.1 grams of damp coaggullum was collected), and characterized. The final polymer emulsion had a solids content of 43.4% and a particle size of 113 nm (Brookhaven BI-90). The latex polymer II had an acid number of 19.

EXAMPLE 3

Latex polymer III was prepared as follows:

A monomer emulsion was prepared by mixing the monomers, butyl acrylate (936.0 grams), methyl methacrylate (711.0 grams), acetoacetoxyethyl methacrylate (90.0 grams), ureido methacrylate (18.0 grams), and acrylic acid (45.0 grams), and the chain transfer agent, 1-dodecanethiol (18.0 grams), with deionized water (570 grams) and a 25% aqueous solution (adjusted to pH 7 with ammonia) of Wayfos® M-60 anionic phosphate surfactant (21.6 grams). Into a 5 liter flask, a portion of this monomer emulsion (181.7 grams) was added to a mixture, which was at 71° C., of deionized water (1300 grams) and a 25% aqueous solution (adjusted to pH 7 with ammonia) of Wayfos® M-60 anionic phosphate surfactant (136.8 grams). A solution of ammonium carbonate (5.9 grams) in deionized water (90 grams) was added to the reaction flask followed by a solution of ammonium persulfate (5.6 grams) in deionized water (40 grams). The remainder of the monomer emulsion was then gradually added over 140 minutes while the reaction mixture was maintained at 81° C. After the 140 minute period the reaction was held at 81° C. and 0.1% aqueous ferrous sulfate (10.0 grams), tert-butyl hydroperoxide (1.1 grams of 70% active material) in deionized water (6.0 grams), and isoascorbic acid (0.8 grams) in deionized water (10.0 grams) were added. The tert-butyl hydroperoxide/isoascorbic acid treatment was repeated after a 15 minute period. The reaction mixture was then cooled to 60° C. and enough aqueous ammonia (28%) was added to bring the final pH to 9.0. The reaction mixture was cooled to room temperature, filtered through a 100-mesh screen (on which <0.1 grams of damp coaggullum was collected), and characterized. The final polymer emulsion had a solids content of 44.9% and a particle size of 111 nm (Brookhaven BI-90). The latex polymer III had an acid number of 19.

EXAMPLE 4

Latex polymer IV was prepared as follows:

A monomer emulsion was prepared by mixing the monomers, butyl acrylate (1042.0 grams), methyl methacrylate (752.9 grams), and acrylic acid (46.0 grams) with deionized water (675 grams) and a 25% aqueous solution (adjusted to pH 7 with ammonia) of Wayfos® M-60 anionic phosphate surfactant (42.6 grams). Into a 5 liter flask, a portion of this monomer emulsion (190.5 grams) was added to a mixture, which was at 78° C., of deionized water (1319 grams) and a 25% aqueous solution (adjusted to pH 7 with ammonia) of Wayfos® M-60 anionic phosphate surfactant (119.4 grams). A solution of ammonium carbonate (6.1 grams) in deionized water (40.9 grams) was added to the reaction flask followed by a solution of ammonium persulfate (5.7 grams) in deionized water (40.9 grams). The remainder of the monomer emulsion was then gradually added over 165 minutes while the reaction mixture was maintained at 81° C. After the 165 minute period the reaction mixture was cooled to 75° C. and 0.1% aqueous ferrous sulfate (9 grams), tert-butyl hydroperoxide (1.13 grams of 70% active material) in deionized water (6.1 grams), and isoascorbic acid (0.6 grams) in deionized water (10.2 grams) were added. The tert-butyl hydroperoxide/isoascorbic acid treatment was repeated after a 15 minute period. The reaction mixture was then cooled to 60° C. and enough aqueous ammonia (28%) was added to bring the final pH to 9.4. The reaction mixture was cooled to room temperature, filtered through a 100-mesh screen (on which 0.3 grams of damp coaggullum was collected), and characterized. The final polymer emulsion had a solids content of 44.7% and a particle size of 90 mn (Brookhaven BI-90). The latex polymer IV had an acid number of 19.

EXAMPLE 5

Latex polymer V was prepared as follows:

A monomer emulsion was prepared by mixing the monomers, butyl acrylate (984.2 grams), methyl methacrylate (792.8 grams), and acrylic acid (45.6.0 grams), and the chain transfer agent, 1-dodecanethiol (13.7 grams), with deionized water (560 grams) and a 25% aqueous solution (adjusted to pH 7 with ammonia) of Waylos® M-60 anionic phosphate surfactant (42.1 grams). Into a 5 liter flask, a portion of this monomer emulsion (188.6 grams) was added to a mixture, which was at 81° C., of deionized water (1319 grams) and a 25% aqueous solution (adjusted to pH 7 with ammonia) of Waylos® M-60 anionic phosphate surfactant (118.3 grams). A solution of ammonium carbonate (6.0 grams) in deionized water (40.5 grams) was added to the reaction flask followed by a solution of ammonium persulfate (5.7 grams) in deionized water (40.5 grams). The remainder of the monomer emulsion was then gradually added over 153 minutes while the reaction mixture was maintained at 81° C. After the 153 minute period the reaction mixture was cooled to 75° C. and 0.1% aqueous ferrous sulfate (9 grams), tert-butyl hydroperoxide (1.11 grams of 70% active material) in deionized water (6.1 grams), and isoascorbic acid (0.6 grams) in deionized water (10.1 grams) were added. The tert-butyl hydroperoxide/isoascorbic acid treatment was repeated after a 15 minute period. The reaction mixture was then cooled to 60° C. and enough aqueous ammonia (28%) was added to bring the final pH to 9.1. The reaction mixture was cooled to room temperature, filtered through a 100-mesh screen (on which 0.4 grams of damp coaggullum was collected), and characterized. The final polymer emulsion had a solids content of 44.9% and a particle size of 91 nm (Brookhaven BI-90). Mp as measured by GPC was 70000. The latex polymer V had an acid number of 19.

EXAMPLE 6

Latex polymer VI was prepared as follows:

A monomer emulsion was prepared by mixing the monomers, butyl acrylate (938.9 grams), methyl methacrylate (708.8 grams), acetoacetoxyethyl methacrylate (147.3 grams), and acrylic acid (46.0 grams), and the chain transfer agent, 1-dodecanethiol (13.8 grams), with deionized water (675 grams) and a 25% aqueous solution (adjusted to pH 7 with ammonia) of Waylos® M-60 anionic phosphate surfactant (42.6 grams). Into a 5 liter flask, a portion of this monomer emulsion (190.5 grams) was added to a mixture, which was at 81° C., of deionized water (1299 grams) and a 25% aqueous solution (adjusted to pH 7 with ammonia) of Wayfos® M-60 anionic phosphate surfactant (119.4 grams). A solution of ammonium carbonate (6.1 grams) in deionized water (40.9 grams) was added to the reaction flask followed by a solution of ammonium persulfate (5.7 grams) in deionized water (40.9 grams). The remainder of the monomer emulsion was then gradually added over 147 minutes while the reaction mixture was maintained at 81° C. After the 147 minute period the reaction mixture was cooled to 75° C. and 0.1% aqueous ferrous sulfate (9 grams), tert-butyl hydroperoxide (1.13 grams of 70% active material) in deionized water (6.1 grams), and isoascorbic acid (0.6 grams) in deionized water (10.2 grams) were added. The tert-butyl hydroperoxide/isoascorbic acid treatment was repeated after a 15 minute period. The reaction mixture was then cooled to 60° C. and enough aqueous ammonia (28%) was added to bring the final pH-1 to 9.2. The reaction mixture was cooled to room temperature, filtered through a 100-mesh screen (on which 0.2 grams of damp coaggullum was collected), and characterized. The final polymer emulsion had a solids content of 44.6% and a particle size of 97 nm (Brookhaven BI-90). Mp as measured by GPC was 62000. The latex polymer VI had an acid number of 19.

EXAMPLE 7

Preparation of coatings for adhesion and durability testing
Formulation of Example 7 is decribed below (Quantities are in grams)

Grind for 15 minutes on a Cowles Dissolver

| | | | | | | |
|---|---|---|---|---|---|---|
| Water | 50.0 | 50.0 | 50.0 | 40.0 | 40.0 | 40.0 |
| Tamol ® 681 | 10.2 | 10.2 | 10.2 | 10.2 | 10.2 | 10.2 |
| Drew Plus ® L-475 | 2.0 | 2.0 | 2.0 | 2.0 | 2.0 | 2.0 |
| Kadox ® 515 | 12.0 | 12.0 | 12.0 | 12.0 | 12.0 | 12.0 |
| Ti-Pure ® R-960 | 100.0 | 100.0 | 100.0 | 100.0 | 100.0 | 100.0 |
| Atomite ® | 97.2 | 97.2 | 97.2 | 97.2 | 97.2 | 97.2 |
| Water | 40.0 | 40.0 | 40.0 | 40 | 40 | 40 |
| Tamol ® 165 | 2.0 | 2.0 | 2.0 | 2.0 | 2.0 | 2.0 |
| Beaverwhite ® 325 | 102.8 | 102.8 | 102.8 | 102.8 | 102.8 | 102.8 |
| Water | 15.0 | 15.0 | 15.0 | 0 | 0 | 0 |
| Acrysol ® RM-1020 | 3.0 | 3.0 | 3.0 | 0.8 | 0.8 | 0.8 |

Add the following letdown materials slowly with stirring:

| | | | | | | |
|---|---|---|---|---|---|---|
| Latex Polymer I | | | | 504.6 | | |
| Latex Polymer II | | | | | 512.3 | |
| Latex Polymer III | | | | | | 508.7 |
| Latex Polymer IV | 495.4 | | | | | |
| Latex Polymer V | | 494.8 | | | | |
| Latex Polymer VI | | | 499.6 | | | |
| Texanol ® | 11.1 | 11.1 | 11.1 | 11.3 | 11.3 | 11.3 |
| Skane ® M-8 | 0 | 0 | 0 | 2.0 | 2.0 | 2.0 |
| Propylene Glycol | 35.0 | 35.0 | 35.0 | 35.0 | 35.0 | 35.0 |
| Drew Plus ® L475 | 4.0 | 4.0 | 4.0 | 4.0 | 4.0 | 4.0 |
| Acrysol ® TT-615 | 2.0 | 2.0 | 2.0 | 2.0 | 2.0 | 2.0 |
| Water | 10. | 10. | 10. | 10.0 | 10.0 | 10.0 |
| Aqueous Ammonia 28% | 1.2 | 1.2 | 1.2 | 0 | 0 | 1.4 |
| Acrysol ® RM-1020 | 9.6 | 9.5 | 9.5 | 11.4 | 11.4 | 11.4 |
| Acrysol ® RM-825 | 0 | 0 | 0 | 0.6 | 0.5 | 0.5 |
| Water | 72.8 | 73.5 | 66.8 | 82.8 | 75.5 | 77.5 |

Data on gloss, dirt pick up resistance, adhesion of coating to weathered substrates and galvanized metal made from a latex binder of Example 7.

| Latex Polymer | MW | Column A | Column B | Column C | Column D | Column E | Column F |
|---|---|---|---|---|---|---|---|
| I | Conv | 0 | 1350 gms | 550 gms | 3.0 | 9.0 | 57 |
| II | Low | 0 | >1500 gms | 1350 gms | 5.0 | 9.0 | 37 |
| III | low | 5 | 1350 gms | 1350 gms | 4.7 | 9.3 | 53 |

Note: For Dirt Resistance, panels were exposed for 250 hours in the Weather-O-Meter ®.
Conv = Conventional
MW = Molecular Weight
Column A = weight of % AAEM in the latex polymer
Column B = adhesion to weathered chalky latex coated surface (conducted under force to peel adhesion test)
Column C = adhesion to weathered chalky alkyd coated surface (conducted under force to peel adhesion test)
Column D = exterior durability grain crack resistance (conducted under exterior durability test)
Column E = durability loss of adhesion (conducted under exterior durability test)
Column F = dirt resistance Y-reflectance (conducted under dirt pickup resistance test)

Data of adhesion of coating to weathered substrates, galvanized metal and dirt resistance made form a latex binder of Example 7.

| Latex Polymer | MW | Column A | Column B | Column C | Column D | Column E |
|---|---|---|---|---|---|---|
| IV | Conv | 0 | 350 | 1050 | 8.0 | 40 |
| V | Low | 0 | 950 | 1250 | 5.0 | 34 |
| VI | low | 8 | 1250 | >1500 | 9.0 | 47 |

Note: For Dirt Resistance, panels were exposed for 250 hours in the Weather-O-Meter ®.
Conv = Conventional
MW = Molecular Weight
Column A = weight of % AAEM in the latex polymer
Column B = adhesion to weathered chalky latex coated surface (conducted under force to peel adhesion test)
Column C = adhesion to weathered chalky alkyd coated surface (conducted under force to peel adhesion test)
Column D = adhesion to galvanized metal conducted under Cross hatch adhesion test conducted under ASTM D-3359 (on the scale of 1 through 10, 1 represents poor adhesion and 10 represents no loss of adhesion)
Column E = dirt resistance Y-reflectance (conducted under dirt pickup resistance test)

EXAMPLE 8

Preparation of coatings for adhesion and durability testing
Formulation of Example 8 is decribed below (Quantities are in grams)

Grind for 15 minutes on a Cowles Dissolver

| | | | |
|---|---|---|---|
| Propylene Glycol | 29.2 | 29.2 | 29.2 |
| Water | 29.2 | 29.2 | 29.2 |
| Tamol ® 731 | 5.2 | 5.2 | 5.2 |
| Aqueous Ammonia 28% | 0.8 | 0.8 | 0.8 |
| Triton ® X-405 | 0.8 | 0.8 | 0.8 |
| Foamaster ® VL | 0.8 | 0.8 | 0.8 |
| Ti-Pure ® R-900 | 208.2 | 208.2 | 208.2 |
| Kadox ® 515 | 8.3 | 8.3 | 8.3 |
| Acrysol ® RM-1020 | 2.9 | 2.9 | 2.9 |

Add the following letdown materials slowly with stirring:

| | | | |
|---|---|---|---|
| Latex Polymer IV | 495.4 | | |
| Latex Polymer V | | 494.8 | |
| Latex Polymer VI | | | 499.6 |
| Propylene Glycol | 12.5 | 12.5 | 12.5 |
| Texanol ® | 5.6 | 5.6 | 5.6 |
| Foamaster VL | 0.8 | 0.8 | 0.8 |
| Aqueous Ammonia 28% | 0 | 0.4 | 0 |
| Acrysol ® RM-1020 | 9.3 | 8.1 | 9.6 |
| Water | 54.0 | 54.1 | 52.4 |

Data on gloss, dirt pick up resistance, adhesion of coating to weathered substrates and galvanized metal made from a latex binder of Example 8.

| Latex Polymer | MW | Column A | Column B | Column C | Column D | Column E | Column F |
|---|---|---|---|---|---|---|---|
| IV | Conv | 0 | 200 gms | 500 gms | 43 | 0 | 53 |
| V | Low | 0 | 250 gms | 800 gms | 78 | 1.0 | 31 |
| VI | low | 8 | 450 gms | 750 gms | 76 | 9.5 | 78 |

Note: For Dirt Resistance, panels were exposed for three days in QUV cabinet
Conv = Conventional
MW = Molecular Weight
Column A = weight of % AAEM in the latex polymer
Column B = adhesion to weathered chalky alkyd coated surface (conducted under force to peel adhesion test)
Column C = adhesion to weathered aluminium siding (conducted under force to peel adhesion test)
Column D = Gloss @ 60 degree by Gardener Gloss meter after three days of QUV (b-bulbs) exposure
Column E = adhesion to galvanized metal conducted under Cross hatch adhesion test conducted under ASTM D-3359 (on the scale of 1 through 10, 1 represents poor adhesion and 10 represents no loss of adhesion)
Column F = dirt resistance Y-reflectance (conducted under dirt pickup resistance test)

From the aforedescribed comparision, it can be seen that the latex polymers III and VI have the best overall adhesion, durability and dirtpick up resistance when compared to the conventional latex polymers I, II, IV and V.

The following are the various chemical compositions used in the preparation of the laytex binder of the present invention:

Tamol® 681, Tamol® 165, and Tamol® 731 are anionic copolymer dispersing resins available from Rohm and Haas Co., Philadelphia, Pa.

Acrysol® RM-825, Acrysol® RM-1020 & Acrysol® TT615 are thickeners available from Rohm and Haas Co., Philadelphia, Pa.

Skane® M8 is a mildewcide available from Rohm and Haas Co., Philadelphia, Pa.

Drew Plus® L-475 is a Defoamer avialable from Drew Industrial Division of Ashland Chemical Company, Boonton, N.J.

Kadox® 515 is a zinc oxide pigment available from the New Jersey Zinc Company, Inc. of Palmerton, Pa. Ti-Pure® R-900 & R-960 are titanium dioxides available from DuPont Chemicals, Wilmington, Del.

Atomite® is a calcium carbonate extender available from ECC International, Sylacauga, Ala.

Beaverwhite® 325 is a talc extender available from Luzenac America, Englewood, Colo.

Texanol® is an ester-alcohol coalescent vailable from Eastman Kodak, Kingsport, Tenn.

Triton® X405 is a nonionic surfactant available from Union Carbide, Danbury, Conn.

Foamaster® VL is a defoamer available from Diamond Shamrock Chemicals of Morristown, N.J..

We claim:

1. A method for improving adhesion and gloss of a coating on a weathered substrate, wherein the improvement comprises:

applying on said substrate a film of a latex binder comprising an aqueous evaporable carrier maintained at a pH of 8.5 to 9.5 and having dispersed therein a latex polymer bearing an acid functional pendant moiety and enamine functional pendant moiety wherein said enamine functional pendant moiety results from the reaction of an acetoacetyl functional pendant moiety on said latex polymer with ammonia or amine, said polymer having a peak molecular weight in the range of 10,000 to 200,000, and an acid number in the range of 1 to 70;

evaporating said aqueous evaporable carrier from said film; and exposing said film to actinic light and air to cure said film into said coating on said weathered substrate having improved adhesion.

2. The method of claim 1 wherein said weathered substrate is a chalky, wood or a cement substrate.

3. A method for improving adhesion and gloss of a coating on a weathered substrate, wherein the improvement comprises:

applying on said substrate a film of a latex binder comprising an aqueous evaporable carrier having dispersed therein a latex polymer bearing an acid functional pendant moiety and enamine functional pendant moiety wherein said enamine functional pendant moiety results from the reaction of an acetoacetyl functional pendant moiety on said latex polymer with ammonia or amine, said polymer having a peak molecular weight in the range of 10,000 to 200,000, and an acid number in the range of 1 to 70;

evaporating said aqueous evaporable carrier from said film; and exposing said film to actinic light and air to cure said film into said coating on said weathered substrate having improved adhesion and gloss.

4. The method of claim 3 wherein said latex binder is prepared from 2% to 20% by weight of said polymer of an acetoacetyl functional monomer having the following structure:

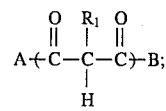

wherein A is either:

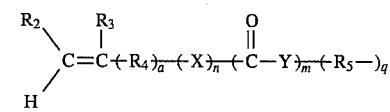

or

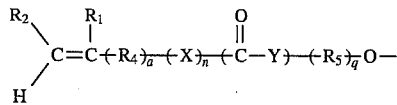

wherein $R_1$ is either H, alkyl having 1 to 10 carbon atoms or phenyl, $R_2$ is either H, alkyl having 1 to 10 carbon atoms or phenyl, halo, $CO_2CH_3$, or CN; wherein $R_3$ is either H, alkyl having 1 to 10 carbon atoms or phenyl, or halo; wherein $R_4$ is either alkylene having 1 to 10 carbon atoms or phenylene; wherein $R_5$ is either alkylene; wherein a, m, n, and q is either 0 or 1; wherein each of X and Y is either —NH— or —O—; and wherein B is either A, alkyl having 1 to 10 carbon atoms or phenyl or heterocyclic.

5. The method of claim 3 wherein said latex polymer comprises a blend of a first polymer having said acid functional pendant moiety and a second polymer having said acetoacetyl functional pendant moiety.

6. The method of claim 5 wherein said blend further comprises a third polymer having both said acid functional and said acetoacetyl functional pendant moieties.

7. A method for improving adhesion and gloss of a coating on a weathered substrate, wherein the improvement comprises:

applying on said substrate a film of a latex polymer comprising an aqueous evaporable carrier having dispersed therein a blend of a first polymer bearing an acid functional pendant moiety and a second polymer having an enamine functional pendant moiety wherein said enamine functional pendant moiety results from the reaction of an acetoacetyl functional pendant moiety on said second polymer with ammonia or amine, said latex polymer having a peak molecular weight in the range of 10,000 to 200,000, and an acid number in the range of 1 to 70;

evaporating said aqueous evaporable carrier from said film; and exposing said film to actinic light and air to cure said film into said coating on said weathered substrate.

8. The method of claim 7 wherein said blend further comprises a third polymer having both said acid functional and said acetoacetyl functional pendant moieties.

* * * * *